(12) United States Patent
Hammer et al.

(10) Patent No.: US 11,839,930 B2
(45) Date of Patent: Dec. 12, 2023

(54) METHOD FOR WELDING COMPONENTS

(71) Applicant: Bayerische Motoren Werke Aktiengesellschaft, Munich (DE)

(72) Inventors: Maik Hammer, Bruckberg (DE); Johann van Niekerk, Munich (DE); Alexander Grimm, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 500 days.

(21) Appl. No.: 16/210,087

(22) Filed: Dec. 5, 2018

(65) Prior Publication Data
US 2019/0105733 A1     Apr. 11, 2019

Related U.S. Application Data

(63) Continuation of application No. PCT/EP2017/064975, filed on Jun. 19, 2017.

(30) Foreign Application Priority Data

Jul. 1, 2016 (DE) ...................... 10 2016 212 057.3

(51) Int. Cl.
*B23K 26/0622* (2014.01)
*B23K 26/06* (2014.01)
(Continued)

(52) U.S. Cl.
CPC ........ *B23K 26/0622* (2015.10); *B23K 26/062* (2015.10); *B23K 26/0626* (2013.01);
(Continued)

(58) Field of Classification Search
CPC .............. B23K 26/062; B23K 26/0622; B23K 26/242; B23K 26/244; B23K 26/323;
(Continued)

(56) References Cited

U.S. PATENT DOCUMENTS 4,857,697 A * 8/1989 Melville ............ B23K 26/0613
219/121.63
5,595,670 A * 1/1997 Mombo-Caristan .........
B23K 15/006
219/121.64
(Continued)

FOREIGN PATENT DOCUMENTS

CN 101494057 A 7/2009
CN 101569961 A 11/2009
(Continued)

OTHER PUBLICATIONS

International Search Report (PCT/ISA/210) issued in PCT Application No. PCT/EP2017/064975 dated Oct. 17, 2017 with English translation ( six (6) pages).
(Continued)

*Primary Examiner* — John J Norton
*Assistant Examiner* — Simpson A Chen
(74) *Attorney, Agent, or Firm* — Crowell & Moring LLP

(57) ABSTRACT

A method for welding components includes the following steps: providing a first component and a second component; bringing together the two components; welding the two components by use of a laser beam, wherein a plurality of welding impulses are generated through the repeated activation and deactivation of the laser beam, with each welding pulse being interrupted by welding-free rest intervals in which the laser beam is deactivated, wherein a local welding area is generated by each welding pulse, in which material of the two components is melted and fused in a locally limited manner, wherein individual welding areas of those generated by the welding pulses overlap.

16 Claims, 3 Drawing Sheets

(51) Int. Cl.
  *B23K 26/22* (2006.01)
  *B23K 26/26* (2014.01)
  *B23K 26/322* (2014.01)
  *B23K 26/324* (2014.01)
  *B23K 26/323* (2014.01)
  *B23K 26/242* (2014.01)
  *B23K 26/244* (2014.01)
  *B23K 26/062* (2014.01)
  *B23K 101/00* (2006.01)
  *B23K 101/34* (2006.01)
  *B23K 103/06* (2006.01)
  *B23K 103/20* (2006.01)
  *B23K 103/00* (2006.01)

(52) U.S. Cl.
  CPC ............ *B23K 26/22* (2013.01); *B23K 26/242* (2015.10); *B23K 26/244* (2015.10); *B23K 26/26* (2013.01); *B23K 26/322* (2013.01); *B23K 26/323* (2015.10); *B23K 26/324* (2013.01); *B23K 2101/006* (2018.08); *B23K 2101/34* (2018.08); *B23K 2103/06* (2018.08); *B23K 2103/20* (2018.08); *B23K 2103/42* (2018.08)

(58) Field of Classification Search
  CPC .... B23K 26/0626; B23K 26/22; B23K 26/26; B23K 26/322; B23K 26/324
  USPC ..................... 219/121.64, 121.65, 121.61
  See application file for complete search history.

(56) References Cited

U.S. PATENT DOCUMENTS

| | | | | |
|---|---|---|---|---|
| 6,163,011 | A * | 12/2000 | Urushizaki | F02M 51/0671 219/121.64 |
| 6,646,225 | B1 * | 11/2003 | Wang | B23K 26/0604 219/121.64 |
| 10,109,306 | B2 | 10/2018 | Furuta et al. | |
| 2006/0144827 | A1 * | 7/2006 | Papenfuss | B23K 26/24 219/121.64 |
| 2007/0267009 | A1 | 11/2007 | Wang et al. | |
| 2007/0289954 | A1 | 12/2007 | Bien et al. | |
| 2009/0223940 | A1 | 9/2009 | Hosoya | |
| 2011/0173797 | A1 * | 7/2011 | van Niekerk | F16B 21/09 29/428 |
| 2011/0240613 | A1 * | 10/2011 | Hosokawa | B23K 26/24 219/121.64 |
| 2013/0008880 | A1 | 1/2013 | Ota | |
| 2013/0327749 | A1 * | 12/2013 | Denney | B23K 35/0261 219/137 PS |
| 2015/0093156 | A1 | 4/2015 | Yokoi et al. | |
| 2016/0016261 | A1 * | 1/2016 | Mudd | B23K 26/242 219/121.64 |
| 2017/0136577 | A1 | 5/2017 | Van Niekerk | |
| 2018/0029163 | A1 * | 2/2018 | Capostagno | B23K 26/082 |

FOREIGN PATENT DOCUMENTS

| | | |
|---|---|---|
| CN | 103212784 A | 7/2013 |
| DE | 198 06 636 A1 | 8/1999 |
| DE | 10 2004 009 109 A1 | 9/2005 |
| DE | 10 2015 004 496 A1 | 12/2015 |
| DE | 10 2014 218 968 A1 | 3/2016 |
| DE | 10 2016 206 012 A1 | 10/2017 |
| EP | 0 276 078 A1 | 7/1988 |
| EP | 0 486 817 A1 | 5/1992 |
| JP | 60-154891 A | 8/1985 |
| JP | 61-115691 A | 6/1986 |

OTHER PUBLICATIONS

German-language Written Opinion (PCT/ISA/237) issued in PCT Application No. PCT/EP2017/064975 dated Oct. 17, 2017 (six (6) pages).

German-language Office Action issued in counterpart German Application No. 102016212057.3 dated Jan. 5, 2017 (four (4) pages).

Chinese-language Office Action issued in counterpart Chinese Application No. 201780022933.2 dated Dec. 11, 2019 with English translation (18 pages).

\* cited by examiner

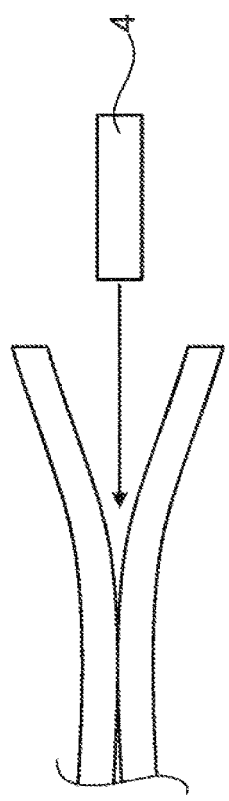
Fig. 5
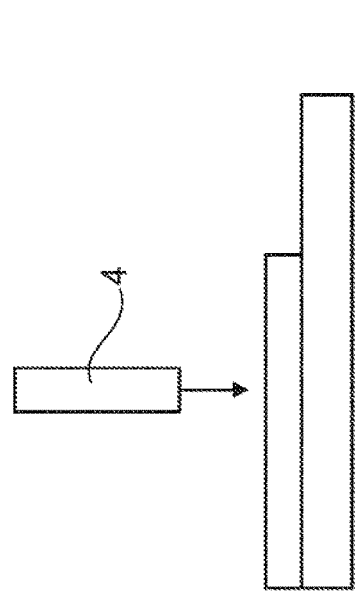
Fig. 6
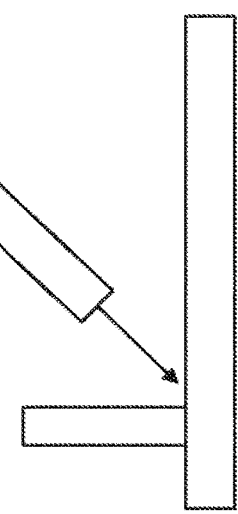
Fig. 7
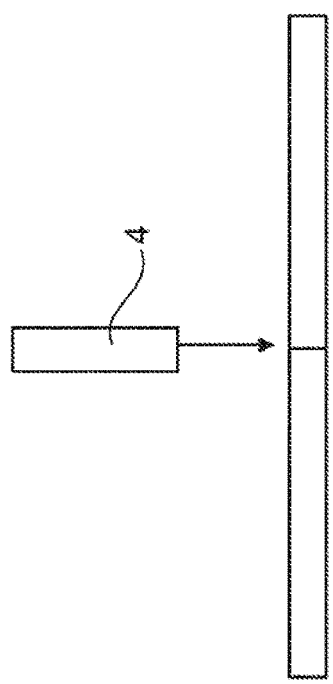
Fig. 8
Fig. 9

METHOD FOR WELDING COMPONENTS

CROSS REFERENCE TO RELATED APPLICATIONS

This application is a continuation of PCT International Application No. PCT/EP2017/064975, filed Jun. 19, 2017, which claims priority under 35 U.S.C. § 119 from German Patent Application No. 10 2016 212 057.3, filed Jul. 1, 2016, the entire disclosures of which are herein expressly incorporated by reference.

BACKGROUND AND SUMMARY OF THE INVENTION

The present invention relates to a method for welding components.

A method of this type is known from the earlier German patent application DE 10 2016 206 012.0 not published before the priority date of the present application. In said earlier German patent application not published before the priority date of the present application, the welding of two vehicle body components by means of a pulsed laser beam is described.

The welding of sheet metal components by use of a laser beam has already long been known. A laser beam is customarily moved here with a continuous advancing movement relative to the two components to be welded to each other, which leads to the melting and fusing of the materials of the two components. The laser beam "pulls" a "melt train" of several millimeters (e.g. 10 mm) behind it because of its advancing movement, i.e. the material is still liquid in a region of several millimeters behind the current position of the laser beam.

The welding of galvanized steel sheets is particularly problematic. This is because the zinc layer already evaporates at approximately 960° Celsius and then escapes in the form of a vapor into the surroundings or accumulates in the molten metal material located therebelow, which may lead to porosities. When metal sheets which are to be welded lie on each other, evaporating zinc cannot readily escape from the contact region of the metal sheets into the surroundings, which may lead to the accumulation of relatively great quantities of zinc in the molten metal and, as a consequence, to undesirably large porosities, holes or possibly to spitting and splashes.

For quality reasons, laser beam welding has therefore up to now only been used in "dry regions" but not in the case of components or in component regions which are exposed to a high extent to moisture or splashing since the risk of corrosion here has up to now been considered to be too high.

It is the object of the invention to provide a laser welding method which leads to high-quality welding connections and which is also suitable for use in vehicle body manufacturing.

This object is achieved by a method for welding components in accordance with embodiments of the invention.

The starting point of the invention is a method for welding a first component and a second component. The components which are provided are first of all placed on each other and are subsequently welded to each other by use of a laser beam. The welding takes place in a pulsed manner, i.e. the laser beam is repeatedly switched on and off, as a result of which a multiplicity of welding pulses are produced. The individual welding pulses are each interrupted by welding-free pause intervals in which the laser beam is switched off.

According to the invention, each welding pulse produces a local welding area in which material of the two components is melted and fused to a locally limited extent. The term "welding area" should be understood as meaning a relatively small, e.g. "punctiform" region or region in the manner of a circular surface, with other geometries also being conceivable, of course. Such a welding area can lie in terms of order of magnitude, for example, within a (diameter) range of between a few micrometers and a few millimeters (e.g. up to 3 or 4 or 5 mm).

An essential concept of the invention consists in that individual welding areas of the welding areas produced by the welding pulses overlap. A cohesive weld seam can thereby be constructed from a multiplicity of overlapping welding areas.

In contrast to conventional laser welding methods, in which the laser beam is moved at a certain advancing speed relative to the components to be welded, it can be provided according to the invention that the laser beam remains stationary relative to the two components during the individual welding pulses. A currently produced welding area can be irradiated continuously, in particular continuously completely or extensively, with laser light during the welding pulse. If, during the welding, no relative movement of the laser beam with respect to the components takes place, in contrast to the prior art a welding train is also not re-drawn.

Owing to the pulsed admission of energy, melting of the material of the components to be welded to each other takes place in an extremely focused and locally extremely limited manner. The material is therefore significantly heated substantially only in the region melted currently by the laser beam. Even at a distance of just a few millimeters from the current welding area, there is scarcely any increase in temperature. This has the advantage that components in which temperature-sensitive parts, e.g. a plastics component or adhesive layer or the like, are located relatively close to the currently produced welding area, can nevertheless be easily welded to each other.

As already mentioned, it can be provided that individual welding areas of the welding areas produced by the welding pulses overlap to form a cohesive, fluid-tight weld seam. According to the invention, it can be provided that the laser beam is positioned in such a manner that a currently produced welding area overlaps in a scale-like or seam-like manner with an already produced or welded welding area.

Preferably, a currently produced welding area overlapping with the already produced welding area is produced or melted only when the already produced welding area, which is intended to be partially overlapped by the welding area to be produced, has already solidified again or is substantially solidified.

It can be provided that welding areas are produced sequentially one after another, specifically in a sequence, and therefore the welding areas produced directly after one another overlap in a scale-like manner. In other words, this means that a currently produced welding area overlaps with a welding area which was produced directly before the last pause interval. In this method, welding areas are therefore produced sequentially one after another in a similar manner to a pearl necklace.

Alternatively thereto, it is also possible for a currently produced welding area to be at a distance from a welding area which was produced directly before the last pause interval. The currently produced welding area is therefore free of overlapping with respect to the welding area produced directly before the last pause interval. As a result, the local admission of heat or the local rise in temperature in the components to be welded to each other can be minimized even further. Nevertheless, a cohesive, fluid-tight welding seam can also be produced in this manner, and, in contrast to the above-described method, the individual welding areas of the weld seam are not placed one onto the preceding one, but rather in a different sequence.

The pulse durations of the multiplicity of welding pulses can lie, for example, within a range of between 0.1 ms and 100 ms, or within a range of between 0.1 ms and 50 ms or within a range of between 0.1 ms and 20 ms. The pulse durations of the multiplicity of welding pulses preferably lie within a range of between 1.0 ms and 20 ms or 1.0 ms and 10 ms. With pulse durations of this type, very local melting is possible with a comparatively low admission of all of the heat into the component.

The pulse durations of the multiplicity of welding pulses can each be identical in length. However, this does not have to be so. The pulse durations of the multiplicity of welding pulses can also be different in length. For example, it may be expedient, in regions in which the components which are to be welded to one another have a greater component thickness, to work with a longer welding pulse duration than in component regions in which the component thicknesses are smaller.

The power density of the laser beam used for the invention can lie, for example, within the range of between $10^4$ watt/cm$^2$ and $10^{10}$ watt/cm$^2$. It can be provided here that the power density of the multiplicity of welding pulses is identical or different in size. Analogously to the length of the pulse durations, it can be provided, for example, that "welding points" in regions in which the components which are to be welded to each other have a greater component thickness is larger than in other regions.

Furthermore, it can be provided that, during a welding pulse, the power density of the welding pulse is changed, e.g. by changing the laser power with the beam cross section being kept constant, or changing the beam cross section with the laser power being kept constant, or changing the laser power and the beam cross section.

According to a development of the invention, use is made of a laser beam which has a beam diameter or a beam width which lies within the range of between 40 µm and 4 mm. Also in the case of this parameter, it can be provided that the beam diameter or the beam width of the laser beam is identical or different for the multiplicity of welding pulses. Depending on the application, it may be desirable to produce a weld seam which has a substantially identical weld seam width or a different weld seam width over its entire length, which can be set by varying the beam diameter or the beam width of the laser beam.

With regard to the cross section of the laser beam, it is possible, for example, for use to be made of a laser beam which has a circular beam cross section. However, this does not necessarily have to be the case. Other cross-sectional shapes, e.g. a laser beam with a rectangular or oval beam cross section, are basically also contemplated.

Tests have revealed that very high quality welding connections can be achieved if use is made of a "repetition rate" which lies within the range of between 200 Hz and 10 kHz. The "repetition rate" is understood as meaning the number of welding pulses per second. If, for example, use is made of welding pulses of a length of 5 ms and a pause interval of 15 ms, this results in a period duration T of 20 ms, which corresponds to a repetition rate of 1/0.02 s or 50 Hz.

With the method according to the invention, metal components, in particular sheet metal components, as, for example, are used in vehicle body manufacturing, can be welded to one another. However, the method according to the invention is not limited to metal components, but rather, in principle, can also be used for welding plastics components, in particular components made from thermoplastic.

The method according to the invention is also readily suitable for welding components in which at least one of the components is partially or completely coated with a coating, as is the case, for example, for galvanized steel sheets. For this purpose, use is preferably made of a component with a coating, the melting point or vaporization temperature of which is lower than the melting point or vaporization temperature of the component material to which the coating is applied. This is the case, for example, for galvanized steel sheets, in which the zinc layer already evaporates at temperatures of about 960° Celsius.

The method according to the invention is not only suitable for welding conventional steel or aluminum sheets but in particular also for welding stainless steel sheet components. Alternatively thereto, the method according to the invention can also be used for welding a steel or aluminum component to a cast component. For example, a steel or aluminum bushing or a steel or aluminum pin can be welded to a cast component or can be welded into a recess of a cast component with the method according to the invention. When "aluminum" is discussed in the description, "aluminum alloys" are also included by this.

The method according to the invention is also eminently suitable for welding balls, in particular steel or aluminum balls, or balls made from a different material (e.g. from a thermoplastic) or other elements (e.g. T pins, other types of pins or the like) onto components. By means of the multiplicity of welding areas, a weld seam extending around the ball can be produced in a contact region of the ball with a component.

The method according to the invention is suitable in particular for welding components, the thickness of which lies within the welding range of between 0.3 mm and 5 mm, in particular within a range of between 0.3 mm and 3 mm.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 5-9 show exemplary embodiments with different seam shapes.

DETAILED DESCRIPTION OF THE DRAWINGS

Figure 1:
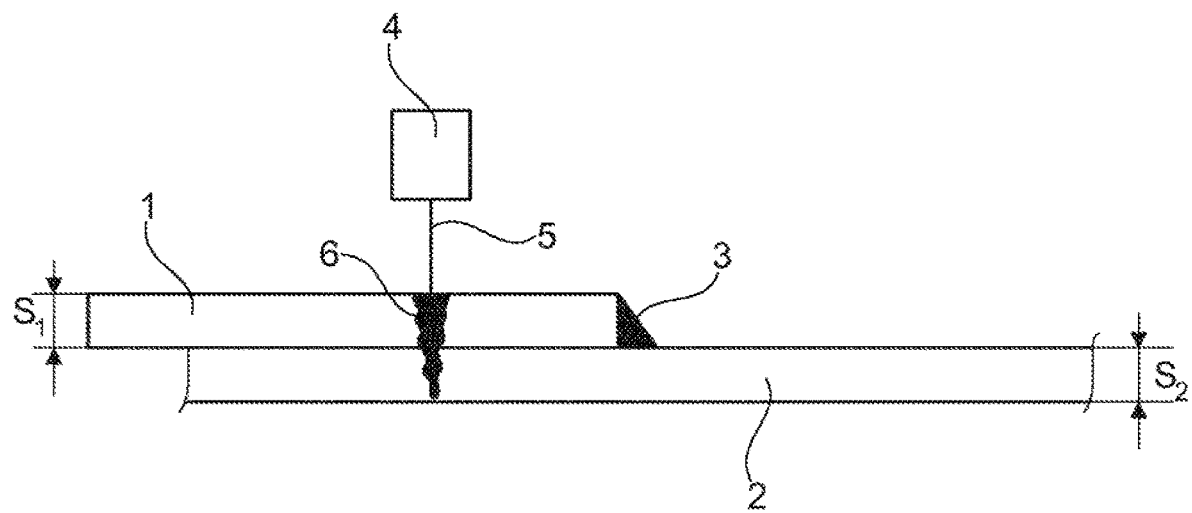
FIG. 1 shows the welding of two sheet metal components in a schematic illustration.

FIG. 1 shows two metal sheets 1, 2 lying one on the other, wherein the thickness of the metal sheet 1 is $s_1$ and the thickness of the metal sheet 2 is $s_2$. For example, $s_1$ and $s_2$ can lie within the range of between 0.3 mm and 3 mm. In the edge region of the metal sheet 1, the two metal sheets 1, 2 have already been welded to each other here by means of a fillet weld 3. However, previous welding by means of the fillet weld 3 is not necessarily required.

The two metal sheets 1, 2 are additionally welded to each other by means of a butt weld 6 using a laser welding device 4 which produces a laser beam 5.

The laser welding device 4 is operated in a pulsed manner here, i.e., by periodic switching on and off of the laser beam 5, a multiplicity of welding pulses are produced one after another and are each interrupted by welding-free pause intervals.

By way of pulsed welding of this type, a ball 7 can also be welded onto a component 1. The ball 7 can be connected to the component 1 by a multiplicity of welding points. Entirely analogously as above, the laser welding device is operated in a pulsed manner here. The laser welding device can be guided here around the contact region of the ball 7. This makes it possible to produce a multiplicity of mutually overlapping welding points or welding areas, as a result of which a very high-quality "encircling" weld seam 8 can be produced.

Figure 3:
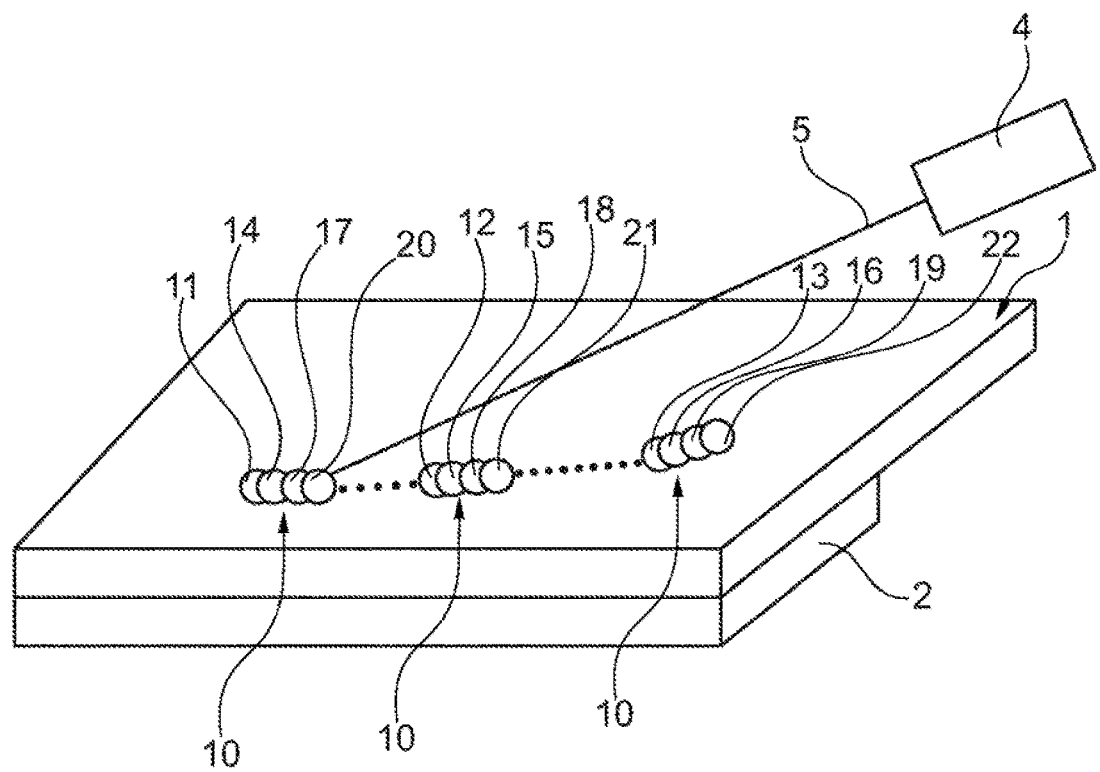
FIG. 3 shows the sequential production of a weld seam from a multiplicity of welding areas.

FIG. 3 shows two metal sheets 1, 2 which lie one on the other and are connected to each other by a weld seam 10 which is just being produced. The weld seam 10 is constructed sequentially here by individual welding areas overlapping in a scale-like manner. In order to limit the admission of heat, which is produced by the laser beam 5, into the metal sheets 1, 2 to a local extent as far as possible, it can be provided that the individual welding areas are not all produced next to one another or following one another. For example, it can be provided that the welding areas are produced one after another in the sequence specified by the reference signs 11-22. After the production of the welding area 11, the latter can cool. The welding area 12 produced following the welding area 11 is at a sufficiently large distance from the welding area 11 that the admission of heat into the welding area 12 leaves the cooling of the welding area 11 substantially unaffected, etc.

Figure 4:
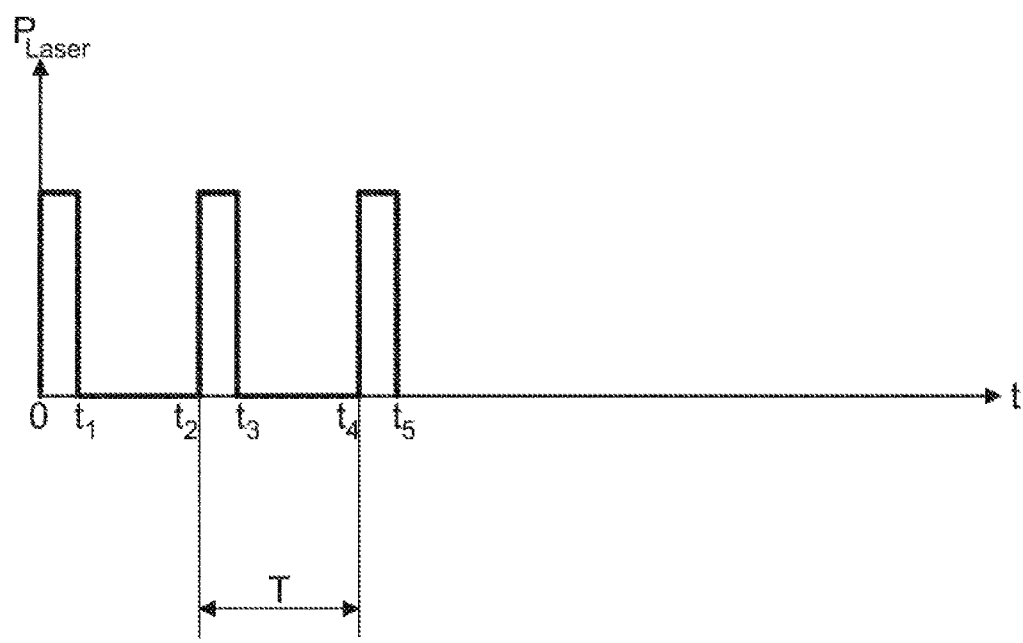
FIG. 4 is a diagram which describes the laser power over time.

FIG. 4 describes the pulsed welding according to the invention with reference to a diagram in which the laser power $P_{laser}$ is plotted over the time t. A first welding pulse extends from point in time 0 to point in time $t_1$. This is followed by a pause interval of length $[t_1, t_2]$.

This is followed by a further welding pulse of length $[t_2, t_3]$, which is followed again by a pause interval of length $[t_3, t_4]$. The period duration, i.e. the length of a welding pulse and a pause interval following the latter, is therefore $T=[t_2, t_4]$.

Figure 2:
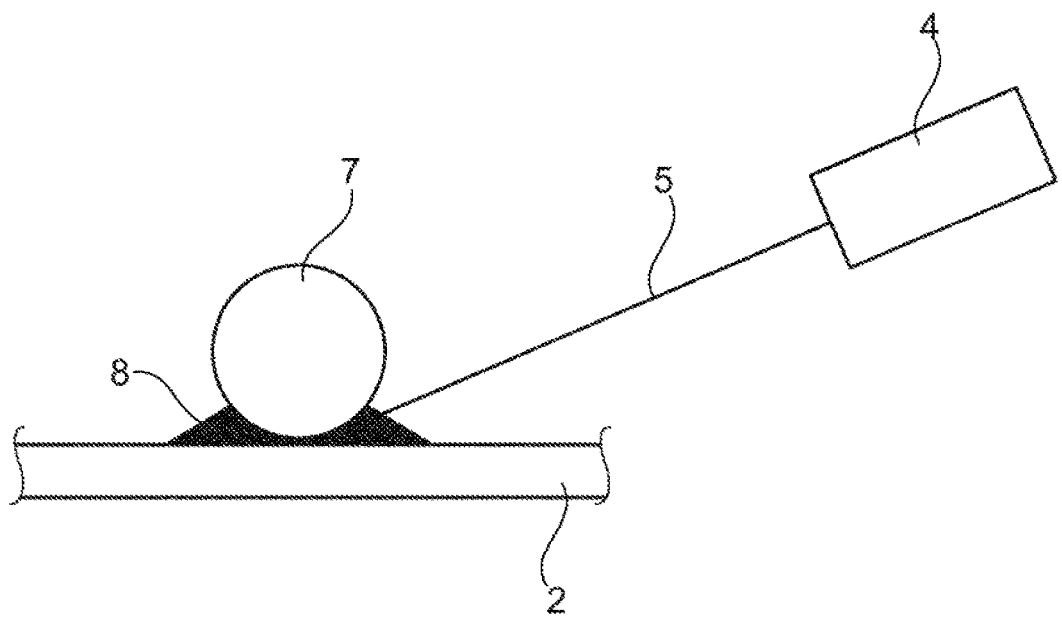
FIG. 2 shows the welding of a ball onto a sheet metal component.

FIGS. 5-9 clarify that the invention is not restricted to the production of the seam shapes shown in FIGS. 1 to 3 but also can be used in the production of all other seam shapes, e.g. in the production of fillet welds (FIG. 6), for example at the lap joint (end fillet weld), at the T joint (FIG. 7), at the flared joint, in the production of classic I seams at the lap joint, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for welding components, the method comprising the steps of:
providing a first component and a second component;
placing the two components on each other; and
welding the two components together by a laser beam, wherein the welding comprises the steps of:
switching on the laser beam for a first pulse duration, during which the laser beam is stationary, so as to generate a first welding pulse at a first position that melts and fuses the two components and thereby produces a first local welding area at the first position;
switching off the laser beam for a welding-free pause interval, during which the first local welding area solidifies and the laser beam is moved relative to the two components from the first position to a second position; and
after the welding-free pause interval, switching on the laser beam for a second pulse duration, during which the laser beam is stationary, so as to generate a second welding pulse that melts and fuses the two components at the second position and thereby produces a second local welding area at the second position, the second position overlapping the first position,
wherein the welding-free pause interval is of different duration than at least one of: the first pulse duration and the second pulse duration, and
wherein the first component is a ball made from steel, aluminum or thermoplastic, which is welded onto the second component that is a body component of a vehicle body to be produced.

2. The method as claimed in claim 1, wherein the first local welding area and the second local welding area overlap within a series of local welding areas to form a cohesive, fluid-tight weld seam.

3. The method as claimed in claim 1, wherein the second welding pulse directly follows the welding-free pause interval, which directly follows the first welding pulse.

4. The method as claimed in claim 1, wherein the first pulse duration and the second pulse duration are each respectively within: 0.1 ms to 100 ms, 0.1 ms to 50 ms, 0.1 ms to 20 ms, 1 ms to 20 ms, or 1 ms to 10 ms.

5. The method as claimed in claim 1, wherein the first pulse duration is of identical duration to the second pulse duration.

6. The method as claimed in claim 1, wherein the first pulse duration is of different duration than the second pulse duration.

7. The method as claimed in claim 1, wherein the laser beam has a power density between $10^4$ watt/cm$^2$ and $10^{10}$ watt/cm$^2$.

8. The method as claimed in claim 7, wherein the first welding pulse has an identical power density to the second welding pulse.

9. The method as claimed in claim 7, wherein the first welding pulse has a different power density than the second welding pulse.

10. The method as claimed in claim 7, wherein the laser beam has a beam diameter or a beam width between 40 µm and 4 mm.

11. The method as claimed in claim 10, wherein the first welding pulse has an identical beam diameter or beam width to the second welding pulse.

12. The method as claimed in claim 1, wherein the laser beam has a circular beam cross section.

13. The method as claimed in claim 1, wherein the first welding pulse has a different beam diameter or beam width than the second welding pulse.

14. The method as claimed in claim 1, wherein the welding is carried out with a repetition rate within a range of between 200 Hz and 10 kHz.

15. The method as claimed in claim 1, further comprising:
producing via the welding, a weld seam extending around the ball in a contact region of the ball on the second component.

16. The method as claimed in claim 1, wherein a power density of the first welding pulse and/or the second welding pulse is changed by:
changing the laser power with the beam cross section being kept constant,
changing the beam cross section with the laser power being kept constant, or
changing the laser power and the beam cross section.

* * * * *